(12) United States Patent
Dolan et al.

(10) Patent No.: US 6,898,275 B2
(45) Date of Patent: *May 24, 2005

(54) METHOD AND APPARATUS FOR PROVIDING EXPANDED TELECOMMUNICATIONS SERVICE

(75) Inventors: Robert A. Dolan, Santa Barbara, CA (US); David F. Hofstatter, Santa Barbara, CA (US)

(73) Assignee: Callwave, Inc., Santa Barbara, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 10/255,567

(22) Filed: Sep. 26, 2002

(65) Prior Publication Data

US 2003/0142807 A1 Jul. 31, 2003

Related U.S. Application Data

(63) Continuation of application No. 09/539,375, filed on Mar. 31, 2000, now Pat. No. 6,477,246.
(60) Provisional application No. 60/127,434, filed on Apr. 1, 1999.

(51) Int. Cl.[7] .................................................. H04M 3/42
(52) U.S. Cl. ............................. 379/211.02; 379/88.11; 379/88.25; 379/93.33; 370/356
(58) Field of Search ........................... 379/67.1, 88.11, 379/88.13–88.17, 88.19–88.28, 93.01, 93.17, 93.23, 93.26, 207.01, 207.04–207.1, 207.14, 207.15, 211.01, 211.02, 219, 220.01, 221.01, 265.01, 265.02, 265.09, 265.11, 142.01, 372, 373.01, 376.01, 900, 908; 370/352–356

(56) References Cited

U.S. PATENT DOCUMENTS

| | | |
|---|---|---|
| 3,936,613 A | 2/1976 | Nishigori et al. |
| 3,956,595 A | 5/1976 | Sobanski |
| 4,009,337 A | 2/1977 | Sakai et al. |
| 4,022,983 A | 5/1977 | Braun et al. |
| 4,485,470 A | 11/1984 | Reali |

(Continued)

FOREIGN PATENT DOCUMENTS

| | | |
|---|---|---|
| CA | 1329852 | 5/1994 |
| WO | WO/06084 | 10/2000 |

OTHER PUBLICATIONS

Article: Johnson, Dave; "Now You're TALKING–voice–response systems for home offices—Product Information"; *Home Office Computing*; http://www.findarticles.com; Feb. 1999.

*Primary Examiner*—Roland G Foster
(74) *Attorney, Agent, or Firm*—Knobbe, Martens, Olson & Bear LLP

(57) ABSTRACT

System and method for putting control of incoming telephone calls in the hands of subscribers with the aid of computer software and the Internet. In effect, a very efficient multiplexer is provided that does not require a change in the behavior of the called party or the calling party. This system permits the called party to hear a spoken message by the calling party in real time, and the content of the spoken message permits the called party to decide how to handle the call. The system adaptively learns and captures the rules of the called party for handling calls, and learns which callers the called party always wishes to talk to. The system uses special control software on the called party's computer which is connected to the Internet. The system employs a central server in which all of the required intelligence is resident. Audio signals are exchanged via non-data channels provided by the telephone companies and by the Internet. Either a very simple Internet busy pick-up is provided, or a very complex messaging system is provided, as desired. A feature is the monitoring and screening of incoming calls before deciding how to handle them. Another feature is the capturing and storage of the decision making profile.

21 Claims, 14 Drawing Sheets

U.S. PATENT DOCUMENTS

| | | | |
|---|---|---|---|
| 4,736,405 A | | 4/1988 | Akiyama |
| 4,809,321 A | | 2/1989 | Morganstein et al. |
| 4,893,336 A | * | 1/1990 | Wuthnow .................. 379/211 |
| 5,040,208 A | | 8/1991 | Jolissaint |
| 5,046,087 A | | 9/1991 | Sakai |
| 5,291,302 A | | 3/1994 | Gordon et al. |
| 5,404,537 A | | 4/1995 | Olnowich et al. |
| 5,434,908 A | * | 7/1995 | Klein ...................... 379/88.23 |
| 5,459,584 A | | 10/1995 | Gordon et al. |
| 5,467,388 A | | 11/1995 | Reed, Jr. et al. |
| 5,526,524 A | | 6/1996 | Madduri |
| 5,533,102 A | | 7/1996 | Robinson et al. |
| 5,577,111 A | | 11/1996 | Iida et al. |
| 5,583,918 A | | 12/1996 | Nakagawa |
| 5,619,557 A | * | 4/1997 | Van Berkum ............ 379/88.16 |
| 5,640,677 A | | 6/1997 | Karlsson |
| 5,651,054 A | * | 7/1997 | Dunn et al. .............. 379/88.11 |
| 5,751,795 A | * | 5/1998 | Hassler et al. ........... 379/93.17 |
| 5,774,067 A | | 6/1998 | Olnowich et al. |
| 4,994,926 A | | 8/1998 | Gordon et al. |
| 5,805,587 A | | 9/1998 | Norris et al. |
| 5,809,128 A | * | 9/1998 | McMullin .............. 379/215.01 |
| 5,812,551 A | | 9/1998 | Tsukazoe et al. |
| 5,825,867 A | | 10/1998 | Epler et al. |
| 5,832,060 A | | 11/1998 | Corlett et al. |
| 5,894,504 A | * | 4/1999 | Alfred et al. ............ 379/88.13 |
| 5,946,386 A | * | 8/1999 | Rogers et al. ......... 379/265.09 |
| 5,960,064 A | | 9/1999 | Foladare et al. |
| 5,960,073 A | * | 9/1999 | Kikinis et al. .............. 379/265 |
| 5,963,629 A | | 10/1999 | Jung |
| 5,995,594 A | | 11/1999 | Shaffer et al. |
| 6,014,436 A | | 1/2000 | Florence et al. |
| 6,032,051 A | | 2/2000 | Hall et al. |
| 6,034,956 A | | 3/2000 | Olnowich et al. |
| 6,035,031 A | | 3/2000 | Silverman |
| 6,044,059 A | | 3/2000 | Olnowich |
| 6,078,581 A | * | 6/2000 | Shtivelman et al. ........ 370/352 |
| 6,104,800 A | * | 8/2000 | Benson .................. 379/215.01 |
| 6,144,644 A | * | 11/2000 | Bajzath et al. ............... 370/259 |
| 6,160,881 A | | 12/2000 | Beyda et al. |
| 6,167,127 A | | 12/2000 | Smith et al. |
| 6,169,796 B1 | * | 1/2001 | Bauer et al. ........... 379/215.01 |
| 6,178,183 B1 | * | 1/2001 | Buskirk, Jr. ................. 370/493 |
| 6,181,691 B1 | * | 1/2001 | Markgraf et al. ........... 370/352 |
| 6,212,261 B1 | * | 4/2001 | Meubus et al. ........... 379/88.12 |
| 6,230,009 B1 | | 5/2001 | Holmes et al. |
| 6,243,378 B1 | | 6/2001 | Olnowich |
| 6,253,249 B1 | * | 6/2001 | Belzile ....................... 704/249 |
| 6,278,704 B1 | * | 8/2001 | Creamer et al. ............ 370/352 |
| 6,304,565 B1 | * | 10/2001 | Ramamurthy ............... 370/352 |
| 6,350,066 B1 | | 2/2002 | Bobo, II |
| 6,353,663 B1 | | 3/2002 | Stevens et al. |
| 6,405,035 B1 | | 6/2002 | Singh |
| 6,411,601 B1 | | 6/2002 | Shaffer et al. |
| 6,411,805 B1 | | 6/2002 | Becker et al. |
| 6,438,216 B1 | * | 8/2002 | Aktas ....................... 379/88.01 |
| 6,438,222 B1 | | 8/2002 | Burg |
| 6,477,246 B1 | * | 11/2002 | Dolan et al. ........... 379/211.02 |
| 6,496,576 B2 | | 12/2002 | Tanaka et al. |
| 6,501,750 B1 | | 12/2002 | Shaffer et al. |
| 6,510,162 B1 | | 1/2003 | Fijolek et al. |
| 6,512,930 B2 | | 1/2003 | Sandegren |
| 6,519,258 B1 | | 2/2003 | Tsukazoe et al. |
| 6,546,087 B2 | | 4/2003 | Shaffer et al. |
| 6,549,612 B2 | | 4/2003 | Gifford et al. |
| 6,567,505 B1 | | 5/2003 | Omori et al. |
| 2002/0097710 A1 | | 7/2002 | Burg |

* cited by examiner

Display presentation is visual and/or audible caller information.

Shown are action buttons for various call and message handling. Actions may also be taken by voice or touch tone commands.

US 6,898,275 B2

METHOD AND APPARATUS FOR PROVIDING EXPANDED TELECOMMUNICATIONS SERVICE

CROSS REFERENCE TO RELATED APPLICATIONS

This application claims priority from U.S. Provisional Patent Application Ser. No. 60/127,434, filed Apr. 1, 1999, which is incorporated herein by reference, and is a continuation of U.S. application Ser. No. 09/539,375, entitled METHOD AND APPARATUS FOR PROVIDING EXPANDED TELECOMMUNICATIONS SERVICE, filed Mar. 31, 2000, now U.S. Pat. No. 6,477,246 which is incorporated herein by reference in its entirety.

TECHNICAL FIELD

The present invention relates generally to a telecommunications system, and more particularly to the control of telephone calls in a telecommunication system by use of personal computer software via the Internet.

BACKGROUND OF THE INVENTION

Many telephone subscribers have a personal computer on their desk and frequently the personal computer is logged in to the same telephone line that would normally be used by the telephone. This is for use of the computer on the Internet. Frequently, incoming telephone calls receive a busy signal because the computer is logged on to the Internet. Thus there are many lost calls. Many individuals and small businesses are searching for ways to simplify and control their telecommunications systems. Many of them are reluctant to acquire additional telephone lines at current prices.

Most telecommunications systems today have limited intelligence. It is estimated that 75% of business calls end in voice mail, an often unsatisfactory conclusion. Calls not completed may result in irritated customers and lost sales. The present invention addresses this waste of human and business resources by using the Internet and Internet telephony to deliver control of a customers telecommunication for the individual or small business.

BRIEF SUMMARY OF THE INVENTION

The present invention ranges from an internet busy pickup through a very complex messaging system. All that is required at the subscribers location is special software for use on a personal computer in connection with the internet. The system of the present invention operates a central server which receives incoming telephone calls when a user is connected to the Internet. The company's central server delivers the calling and called number information to the user's desktop computer for all calls. The user may elect to pick up that call in which case a direct Internet connection is made between the users desktop computer and the telephone system. If the user does not answer the call or the user is not logged on line to the Internet, the company's central server takes the message or optionally forwards the call to a traditional phone line or a cell phone. The information about the call is then spoken to the customer who can again make a decision whether to take that call.

It is presently contemplated that the system of the present invention takes the call only if the subscriber's line is busy and the calling parties number is recorded in memory storage at the central server. It is also contemplated at present that the caller can provide a spoken message which can be played via the Internet to the subscriber at which time the subscriber can make a decision as to how to handle the call. These features are offered without the necessity for a behavior change by either the calling party or the called party. However, other messaging features can be offered, if desired. This makes the system of the present invention as complex as is desired. It can be extremely simple for the unsophisticated customer and yet can offer many advanced features for those that desire them.

Other features of the present invention are disclosed or apparent in the section entitled: "BEST MODE FOR CARRYING OUT THE INVENTION."

BRIEF DESCRIPTION OF DRAWINGS

For a fuller understanding of the present invention, reference is made to the accompanying drawing in the following detailed description of the Best Mode of Carrying Out the Present Invention. In the drawing, the same reference characters are used to refer to the same elements of the present invention throughout the several figures of the drawing.

BEST MODE FOR CARRYING OUT THE INVENTION

Figure 1:
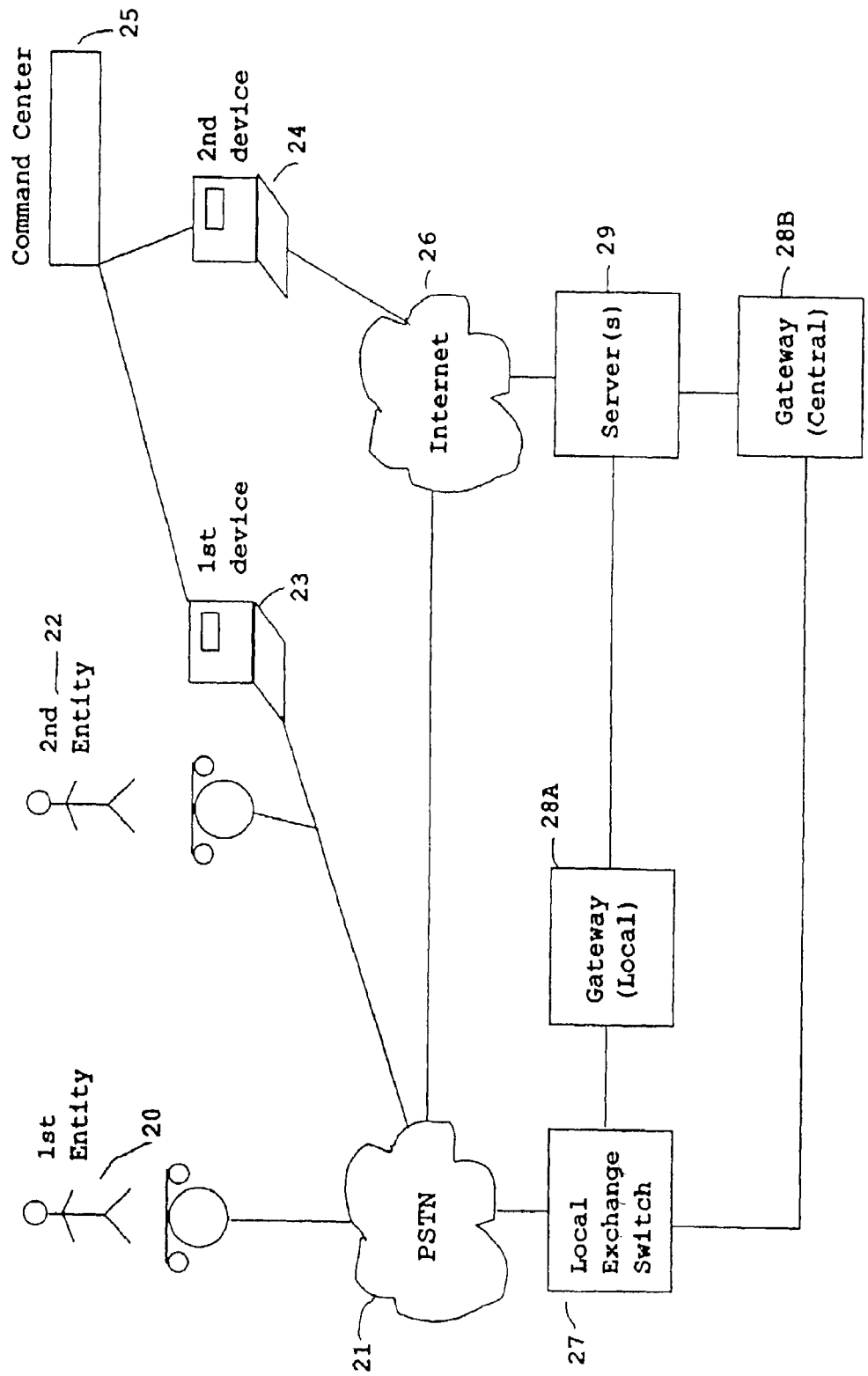
FIG. 1 is a schematic representation of one embodiment of the present invention.

FIG. 1 is a schematic representation of the organization of one embodiment of the present invention. FIG. 1 shows a first entity 20 connected to the Public Switched Telephone Network (PSTN) 21. A second entity 22 is also connected to the PSTN 21. The second entity 22 is illustrated as having a first device 23 indirectly connected to the Internet 26 through a PSTN 21 provided dial-up connection shared with the telephone of the second entity 22. The second entity 22 is also shown to have a second device 24 directly connected to the Internet 26. Both devices host a software based Command Center 25. The devices may or may not be logged onto the Internet 26. FIG. 1 also shows a local exchange switch 27 connected to the PSTN 21. The system directs the call and the call information of the first entity 20 through the PSTN 21 to the local exchange switch 27 and then to a gateway 28; said gateway can be implemented as a local gateway 28A near the switching system 27 or a centralized gateway 28B near the server 29. The gateway forwards the call information to the Server (or array of Servers) 29 which then communicates to the Command Center 25 over an Internet Protocol connection that is by a plurality of means, including a single phone line dial up connection (e.g. as shown in the case of the first device 23) an always on landline home connection (for example as shown in the case of the second device 24) an always on landline office connection or an always on wireless connection. The Server 29 and the Command Center 25 then interact to coordinate the dialog with the first entity 20 over the PSTN 21 and the second entity 22 over the appropriate device 23 or 24.

Figure 2:
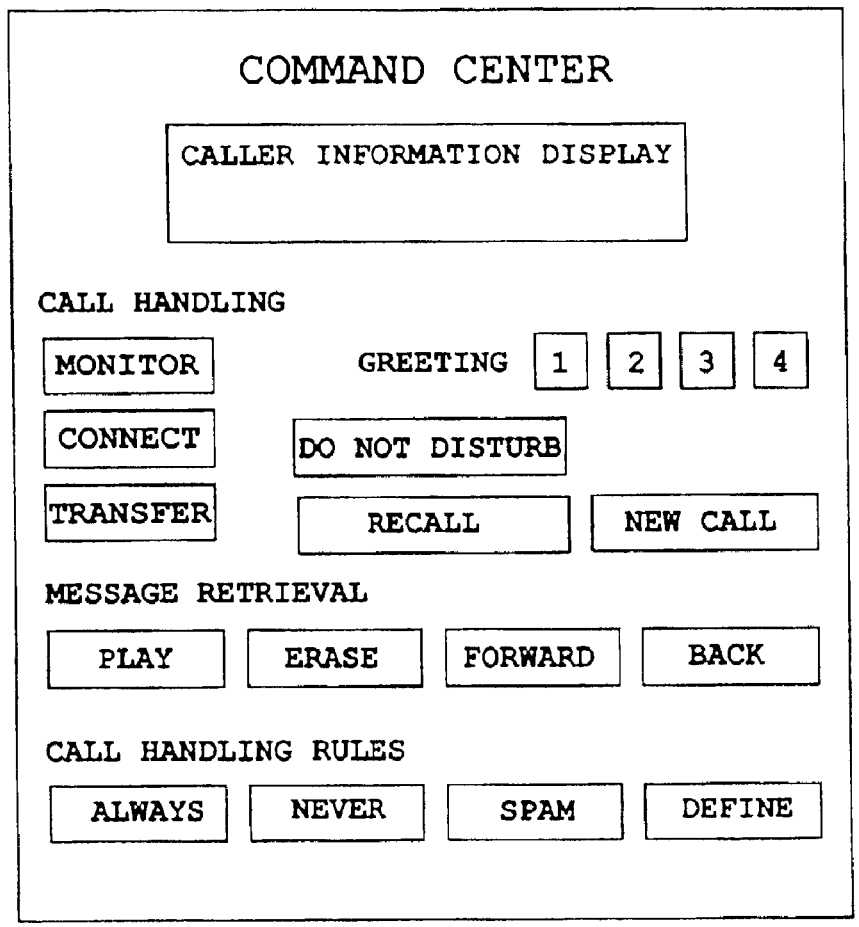
FIG. 2 is an example of a typical screen for a control panel.

Referring now to FIG. 2 of the drawings, an example of a typical screen for command center 25 a control panel is shown. It should be understood that the control panel may have messages on it other than the ones shown in the figure. The control panel of FIG. 2 would typically show up in a small area of the monitor screen of the subscriber's device desktop (e.g. computer) 23 & 24. For example, the control panel of FIG. 2 may occupy only a 1 inch by 2 inch corner of the screen. The control panel of FIG. 2 displays status of the incoming call and allows the second entity 22 to coordinate interactions with the server 29. The command center interface supports a plurality of call control inputs including a) no input b) transfer call over circuit switching network c) take call over Internet Protocol d) reoriginate the call over circuit switched or Internet Protocol network e) have the server interact with the caller to provide information or record the audible signal.

Figure 3:
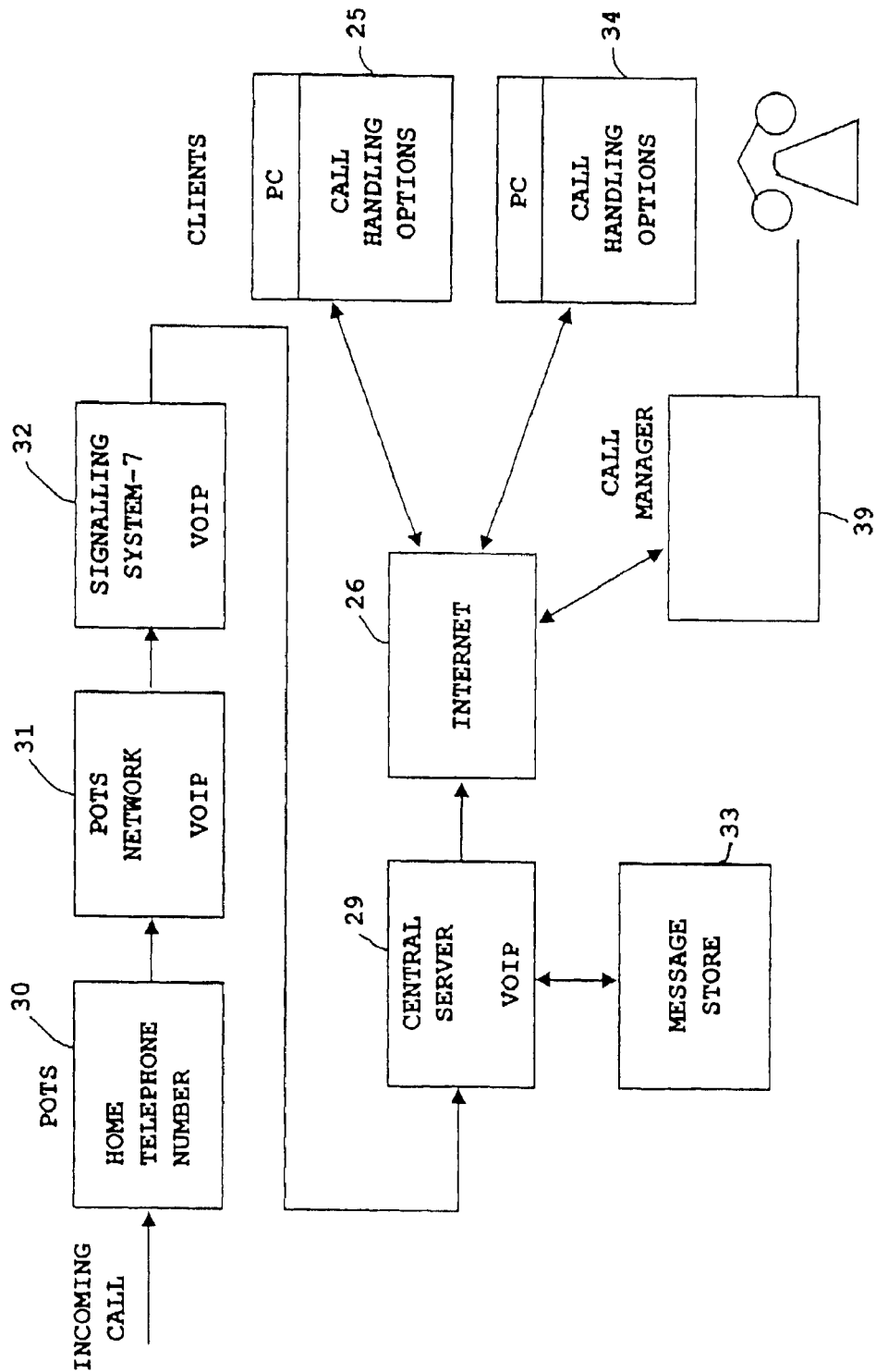
FIG. 3 is a more detailed version of the communication path of the system of the present invention.

Referring now to FIG. 3 of the drawings, there is shown a more detailed version of the communication path of the system of the present invention. An incoming call is illustrated as being directed to a home telephone number 30 in the Plain Old Telephone System (POTS) which is passed on to the POTS Network 31. The POTS Network 31 is shown connected to a Signaling System 7 (SS7) 32. The telephone system employs what is known as Common Channel Signaling (CCS). This is a signaling system used in telephone networks that separates signaling information from user data. A specified channel is exclusively designated to carry signaling information for all other channels in the system. The SS7 32 is one of the standard CCS systems used by the telephone company. The SS7 32 is connected to the central server 28. The SS7 32 normally connects between central offices. Because the present invention uses the SS7 32, it appears to be a central office to the telephone companies. The system of the present invention is actually a class 5 telephone office. A message store memory 33 is located at the central server 29 for storing messages. The central server 29 communicates through the internet 26 to the personal desktop computer 25 of the client. The central server 29 is shown as also communicating to a second client having a personal desktop computer 34. A call merger 39 connects from the Internet 26 to a telephone instrument.

When an incoming call comes in to the home telephone number 30, the central server 29 interacts with the caller. It makes a record of the caller's telephone number or prompts the caller to unblock the telephone so as to give the caller's telephone number. The central server 29 may give the caller options that can be answered by a touch tone response, or it may ask for a voice messsage to be passed on to the subscriber. If an audio message is given to the central server 29, that message is passed along using Voice Over IP (VOIP) which is used in the telephone system and over the internet. The letters IP stand for Internet Protocol.

Teleconferencing over the internet is done using a standard developed by the International Telecommunications Union (ITU). This standard is known as ITU-T H.323. This provides for audio and video in a teleconferencing context. From the standpoint of VOIP, the video component of the teleconferencing signal is ignored and only the audio is used. This permits audio to be transferred from the incoming call at the home telephone number 30 to the client's personal desktop computer 25. The client can listen to the message from the incoming call before making a decision as to the handling of the call. The server communicates to a command center running on a multiplicity of platforms and providing a control interface to the second entity. The command center is a software and device solution that can be hosted alternatively on a personal computer, a handheld computing device, a wireless telephone, a television, a web interface appliance, or a command center server using voice and DTMF tone interaction with a telephone device.

Figure 4:
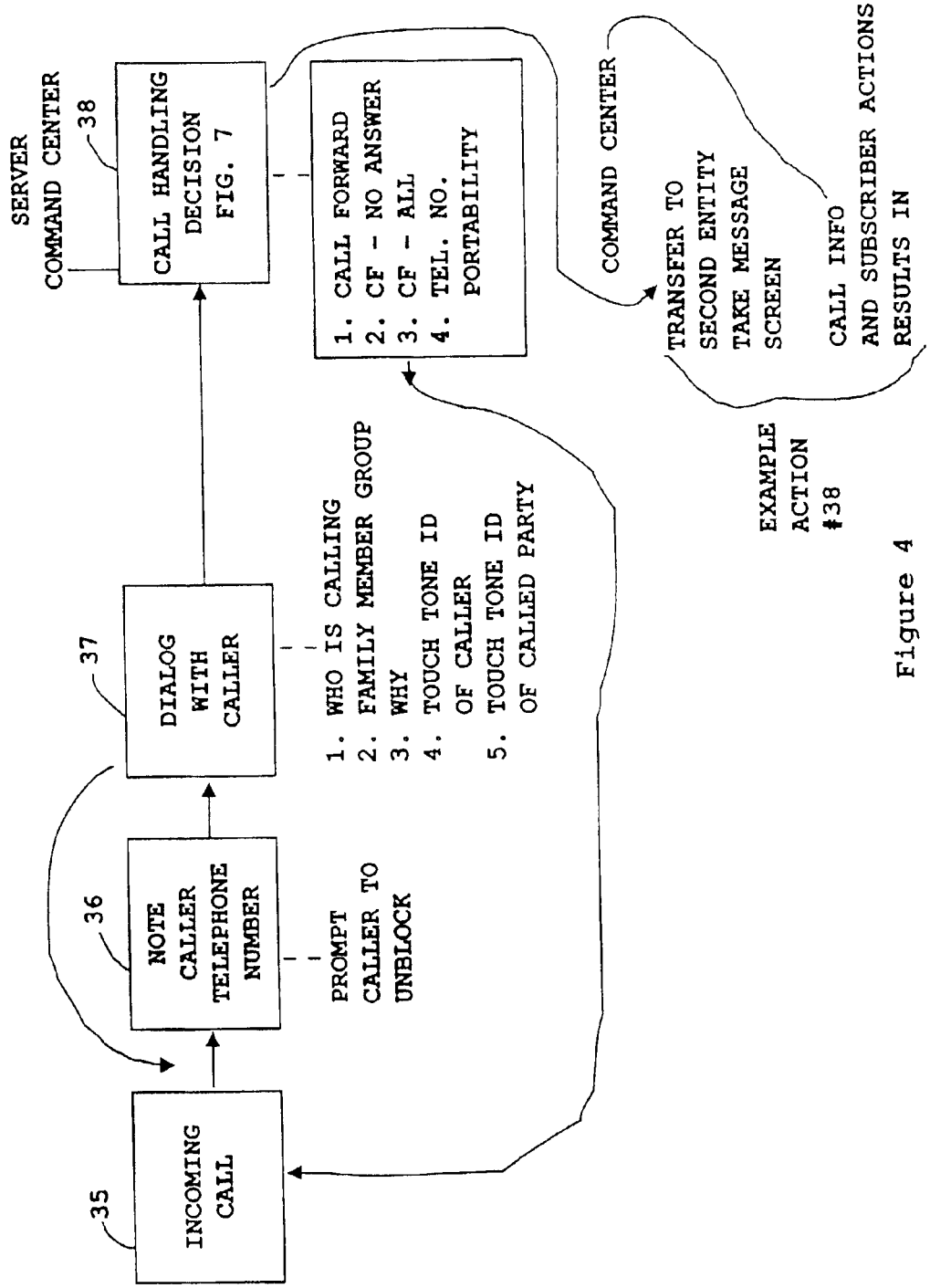
FIG. 4 is a schematic diagram of the call handling process.

Referring now to FIG. 4, there is shown a schematic diagram of the call handling process. Box 35 indicates the arrival of an incoming call. The options may include forward the call, call forward no-answer, forward the call always, and it may provide for switching the call to a different telephone number, for example that of a cell phone or other device. The caller may be presented with voice mail type options. For example, if you wish to talk with Mr. Jones, press 1, if you wish to talk with Mrs. Jones press 2, if you wish to talk with Susie Jones press 3. The caller may be required to give a touch tone ID, or to provide a touch tone ID of the called party. The dialog process is for the purpose of obtaining as much information as possible as to who is calling, which family member is being called, and why. The caller may be asked to speak a message into the telephone as would be done with an answering machine. This message is recorded and passed on to the subscriber so that he can listen to it to aid him in making the call handling decision. As shown at box 37, the caller's telephone number is noted by the central server 29, or the caller is prompted to unblock the telephone number. Box 36 indicates that a dialog is conducted by the central server 29 with the caller. Box 38 shows the call handling decision. The system identifies the first entity by the following methods: detecting caller ID and or called number information from the call information received from the switch, by means of voice prompts from the system and tone response from the first entity by which the first entity identifies their number, or the person whom they are calling, or by means of capturing an audible signal from the first entity.

Figure 5:
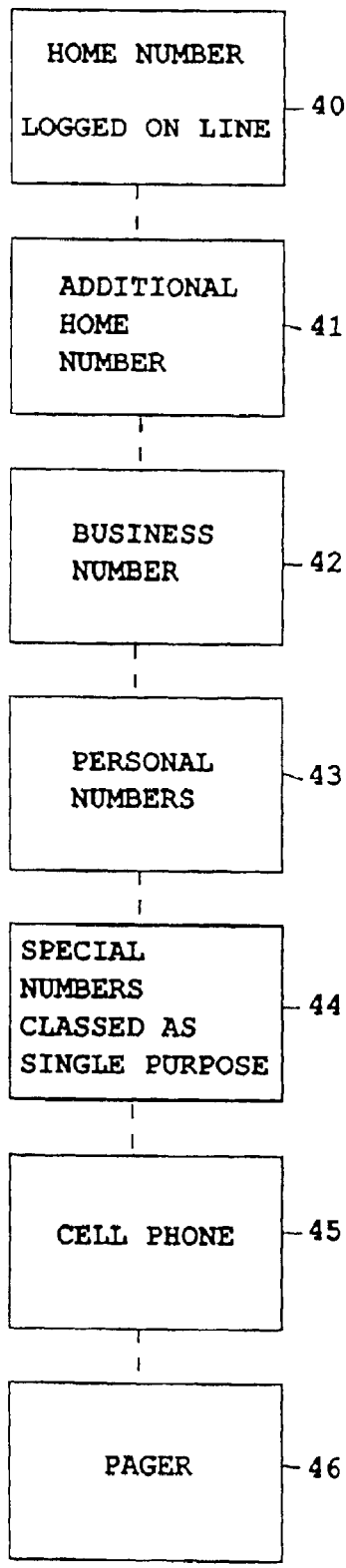
FIG. 5 is the process of locating the subscriber.

The central server 29 may go through a process of locating the subscriber. This is illustrated in FIG. 5. This service is sometimes referred to as find me/follow me. As indicated in FIG. 5, the subscriber may have his home number logged on line for the Internet as indicated in block 40. However, the subscriber may have an additional home number as shown in block 41 or the subscriber may have a business number as shown in block 42. The subscriber may have a personal number as in block 43, or a special number classed as a single purpose number as in block 44. In addition the subscriber may have a cell phone 45 or a pager 46.

It should be understood that as the central server 29 goes through the processes of locating the subscriber, the caller is not aware of any of the procedures that the central server 28 is going through. The caller is unaware of any of the special numbers that the subscriber may have, or equipment such as pagers or cell phones.

Figure 6:
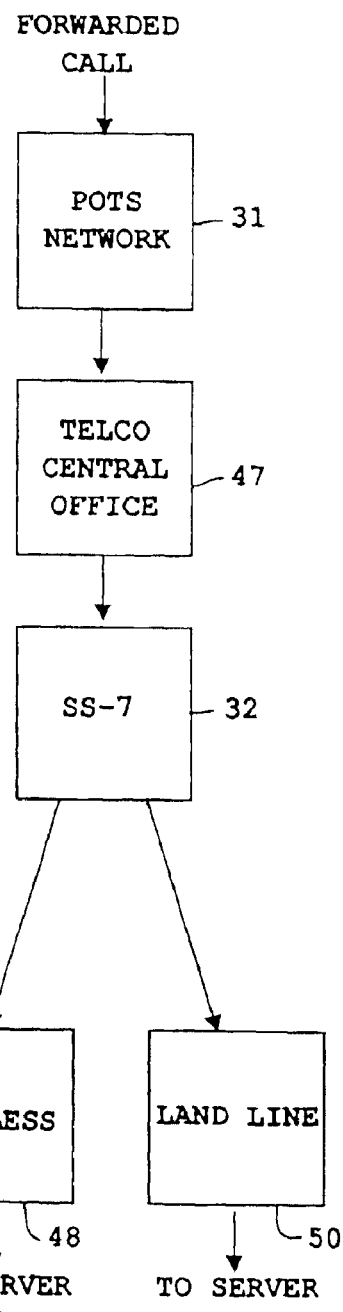
FIG. 6 is an expansion of FIG. 3 showing how a Telco central office can be connected by way of wireless connections or by way of land line connections to the server.

It is not neccesary for the equipment used by the system such as the central server 29 to be located close to the subscriber or close to the called number. For example, as shown in FIG. 6, the POTS Network 31 can be connected through a Telco central office 47 via the SS7 32 by way of wireless connections 48 or by way of land line connections 50 to the server 29 at a remote location.

Figure 7:
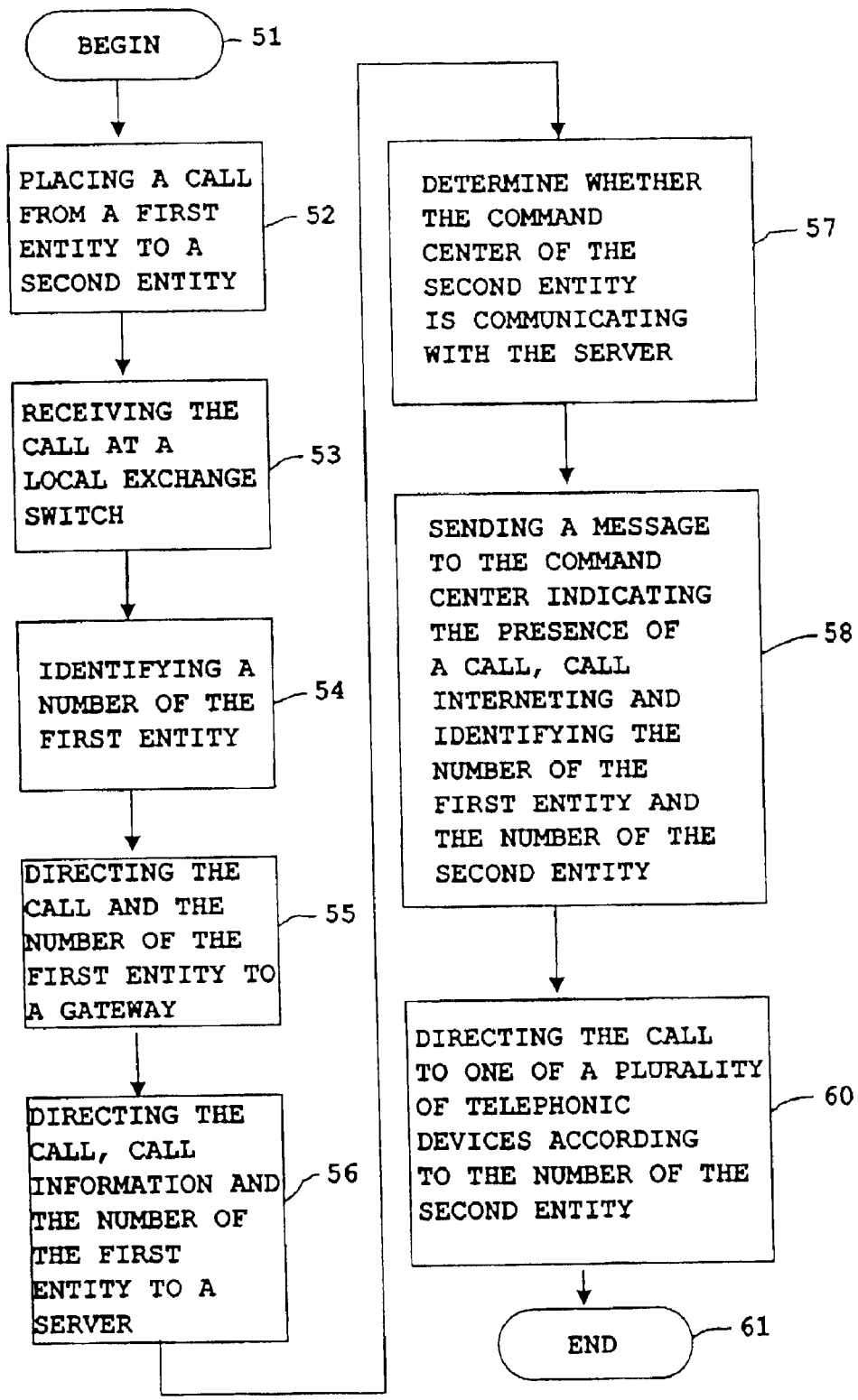
FIG. 7 is a sequence of steps on a flow chart indicating the handling of a call.

It should be understood that the message store memory 33 shown in FIG. 3 may include a list of numbers that the subscriber wishes to speak to always. These may be family members, or business partners, or the like. These may be added to at the subscriber's discretion. Other instructions for call handling may be recorded in the message store memory 33. One of the first things done by the central server 29 is to check to see if there are special instructions for handling of a given incoming call. FIG. 7 shows a sequence of steps on a flow chart indicating the handling of a call. The first box 51 is "begin". Box 52 is "placing a call from a first entity to a second entity". Box 53 is "receiving the call at a local exchange switch". The next step is shown in box 54 as "identifying a number of the first entity". Box 55 is "directing the call and the number of the first entity to a gateway". Box 56 is "directing the call, call information, and the number of the first entity to a server". Box 57 is "determining whether the Command Center of the second entity is communicating with the server". Box 58 is "sending a message to the Command Center indicating the presence of a call and identifying the number of the first entity and the number of the second entity". Box 60 is "directing the call to one of a plurality of telephonic devices according to the number of the second entity" and the last block on FIG. 7 is box 61 "end".

Figure 8:
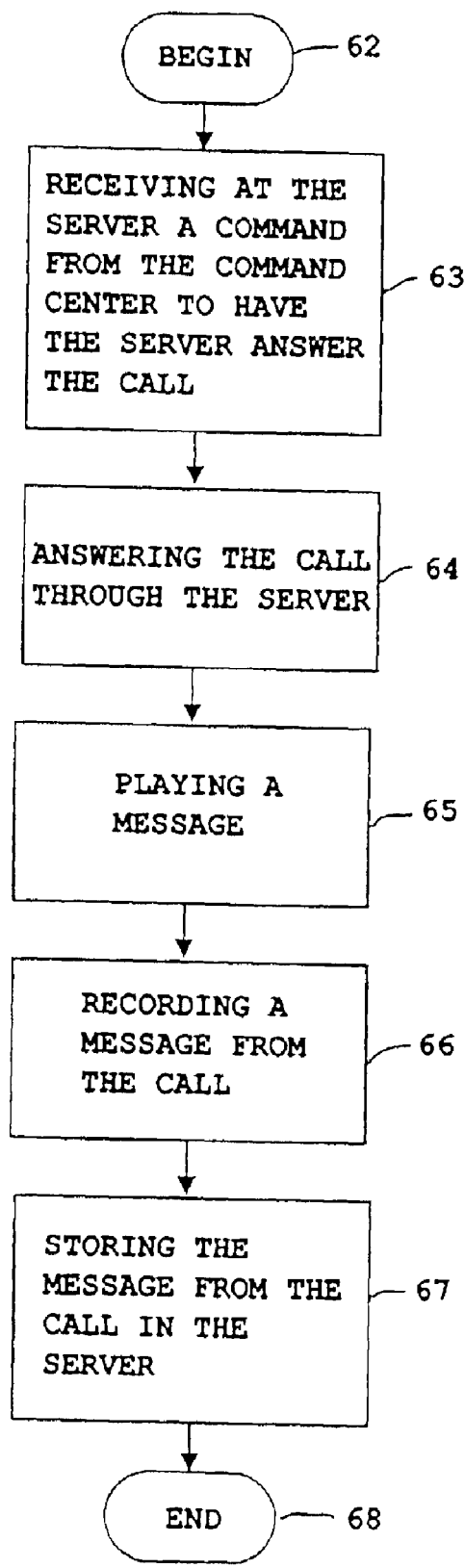
FIG. 8 is a flow chart showing a series of steps in the handling of incoming telephone calls.

FIG. 8 is a flow chart showing a series of steps in the handling of incoming telephone calls. The first block 62 is "begin". Block 63 is "receiving at the server a command from the command center to have the server answer the call". Block 64 is "answering the call through the server". Block 65 is "playing a message". Block 66 is "recording a message from the call". Block 67 is "storing the message from the call in the server". The last block is 68 "end".

Figure 9:
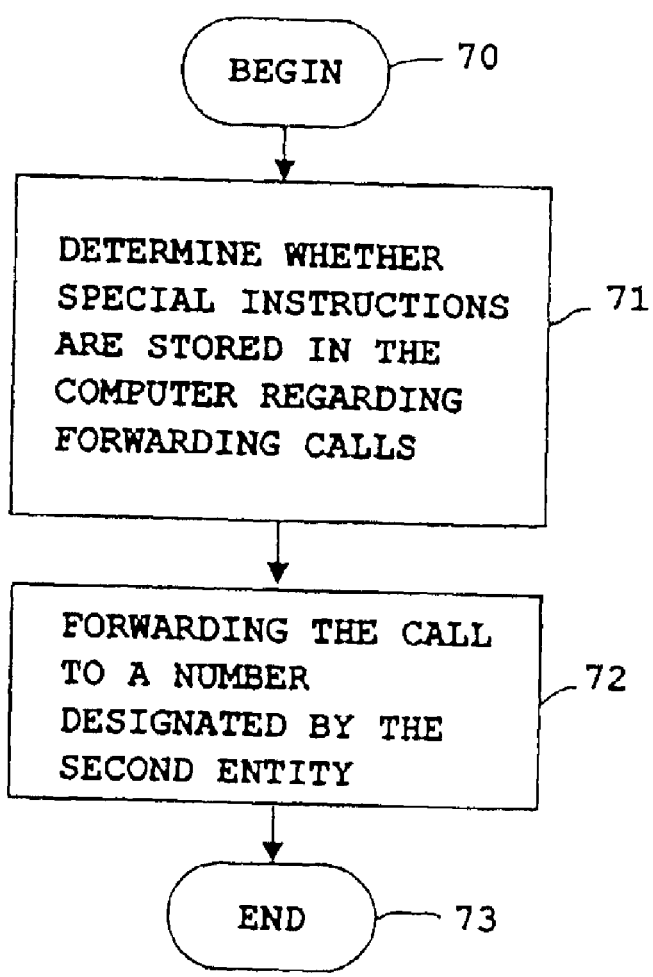
FIG. 9 is a flow chart illustrating further steps in the call handling flow chart.

FIG. 9 is a flow chart illustrating further steps in the call handling flow chart. The first block 70 is "begin". Block 71 is "determining whether special instructions are stored in the computer regarding forwarding calls". Block 72 is "forwarding the call to a number designated by the second entity". Block 73 is "end".

Figure 10:
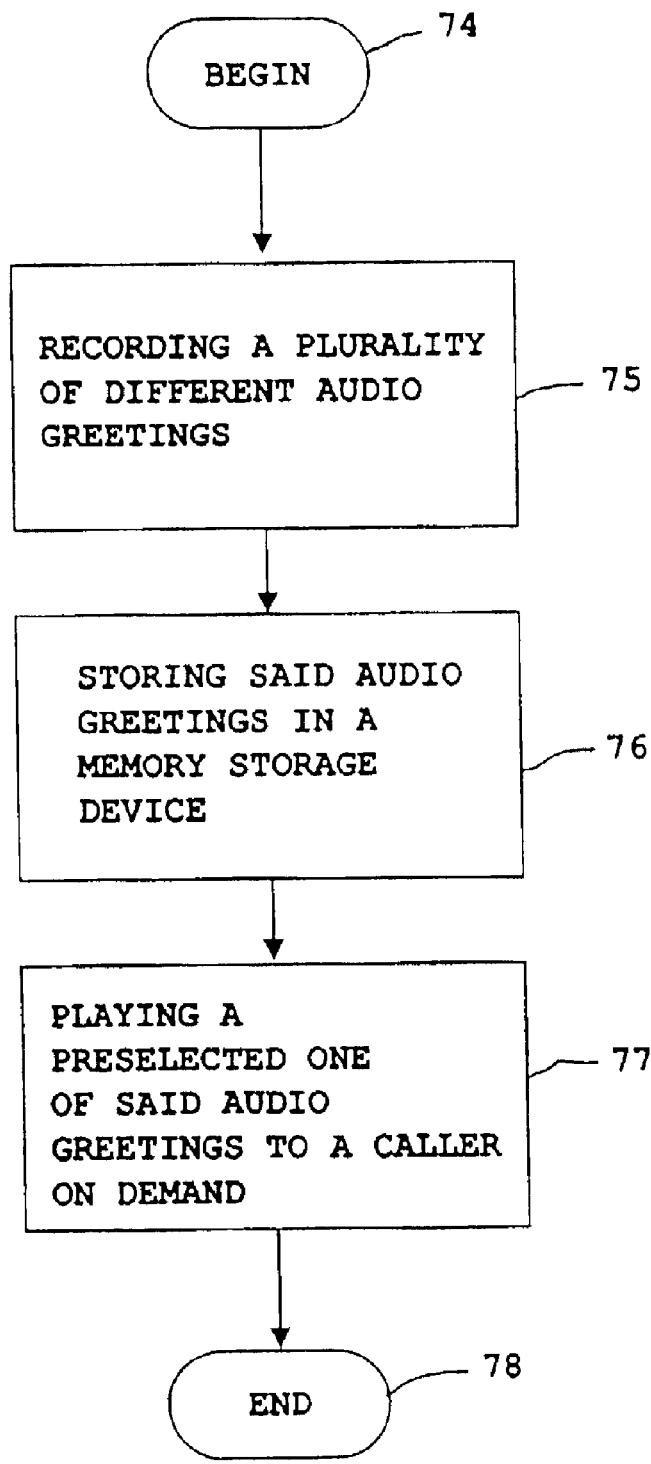
FIG. 10 is a sequence of steps in a flow chart.
Figure 11:
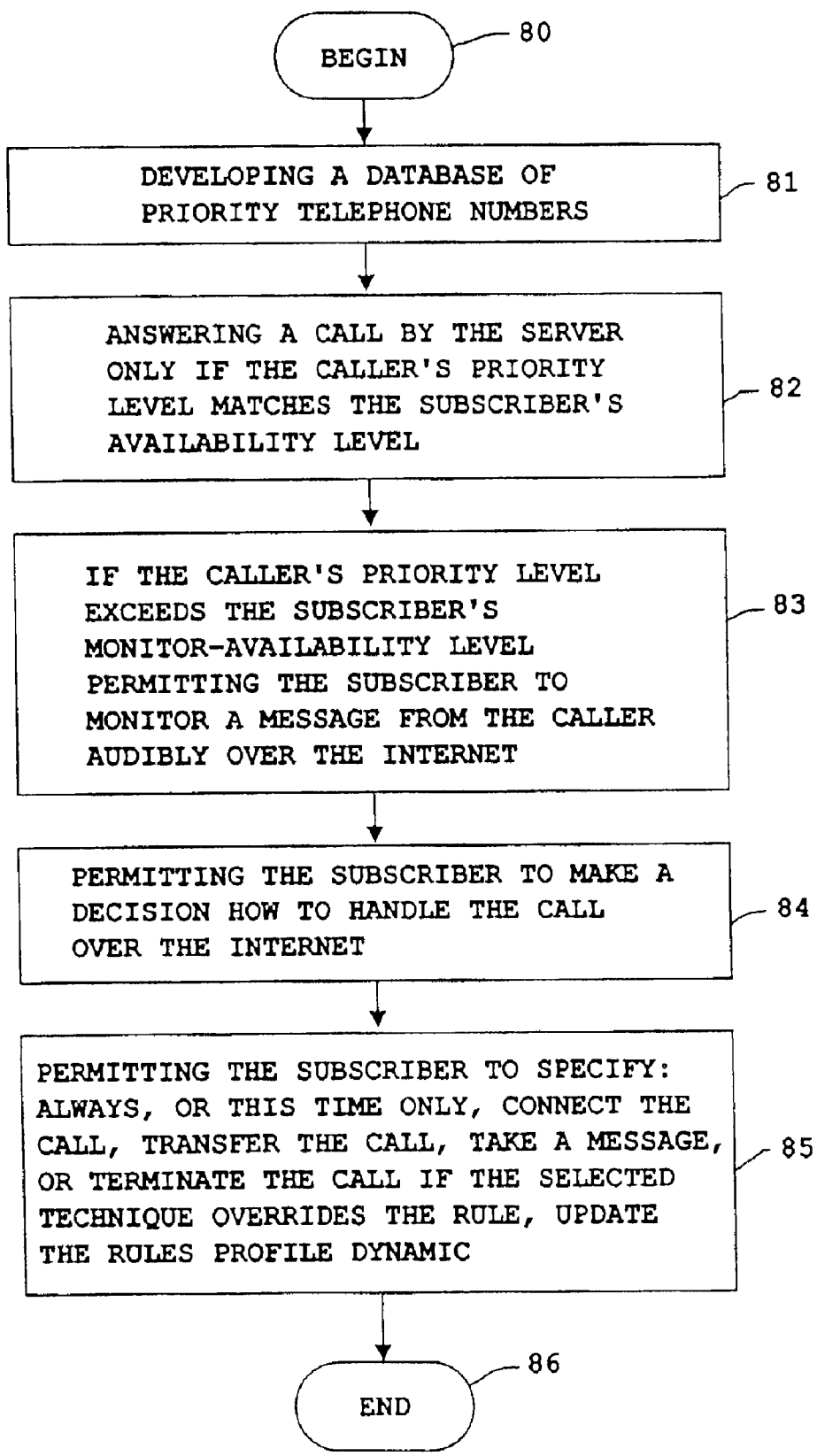
FIG. 11 is a flow chart for steps in deciding how the subscriber answers a call.

As has been indicated hereinbefore, an audible message from the caller may be played to the subscriber to aid him in making a decision for handling the call. However, the subscriber may also record messages, and these messages may be played to the caller as well. There may be a number of different messages depending upon the circumstances, and these may be selectively played as desired. Referring now to FIG. 10, there is shown a sequence of steps in a flow chart. Block 74 is "begin". Block 75 is "recording a plurality of different audio greetings". Block 76 is "storing said audio greetings in a memory storage device". Block 77 is "playing a preselected one of said audio greetings to a caller on demand". Block 78 is "end". Referring now to FIG. 11, this figure shows a flow chart for steps in deciding how the subscriber answers a call. The first block 80 is "begin". Block 81 is "developing a data base of important telephone numbers". Block 82 is "answering a call by the server only if the line is busy and the caller number is in the data base". Block 83 is "permitting the subscriber to monitor a message from the caller audibly over the Internet". Block 84 is "permitting the subscriber to make a decision how to handle the call over the Internet". Block 85 is "permitting the subscriber to specify: always, or this time only, connect the call, transfer the call, take a message, or terminate the call". Block 86 is "end".

Figure 12:
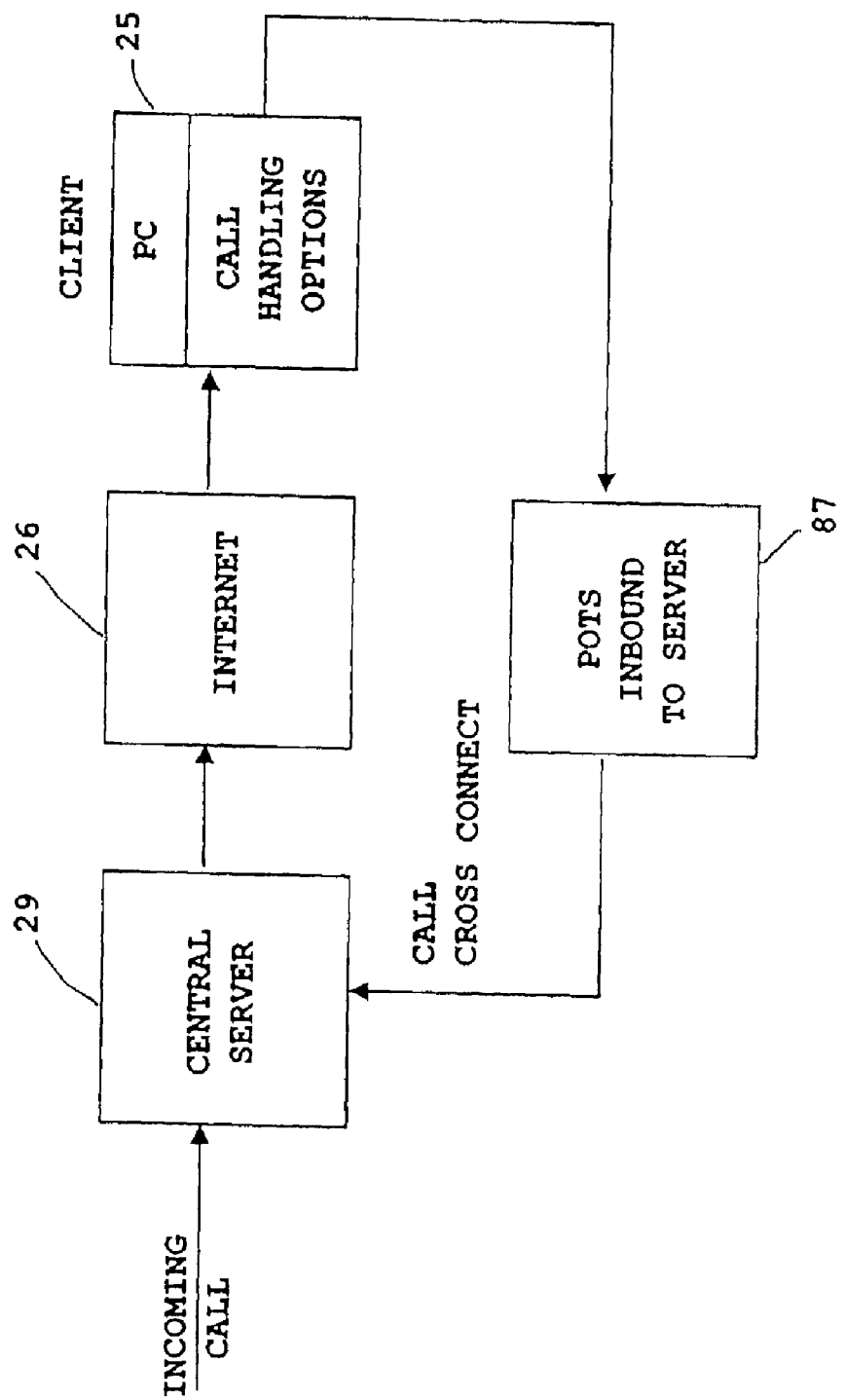
FIG. 12 illustrates calling back into the central server while an incoming call is being held at the server.

The client or subscriber has many ways to deal with an incoming call. He can elect not to answer and to take a message, or he can have the call played through the personal desktop computer 25 and talk to the caller via the Internet 26, or he can have the call transferred to a different instrument such as a second telephone 24 (FIG. 1) or a cell phone 45 (FIG. 5). There is another way for the subscriber to handle a call. While the central server 29 is holding the call, the client can pick up a cell phone or a regular POTS phone and call in to the central server 29 and have a call cross-connect right there. This is illustrated in FIG. 12. This figure illustrates an incoming call arriving at the central server 29. It is connected to the Internet 26 and to the client's personal desktop computer 25. Then, the client may elect to make a POTS inbound call to the server 87. This means, for example, picking up a cell phone or a regular POTS phone and dialing the number to the central server 29. At the central server 29, a call cross-connect is made, and the client can talk to the caller making the incoming call.

Figure 13:
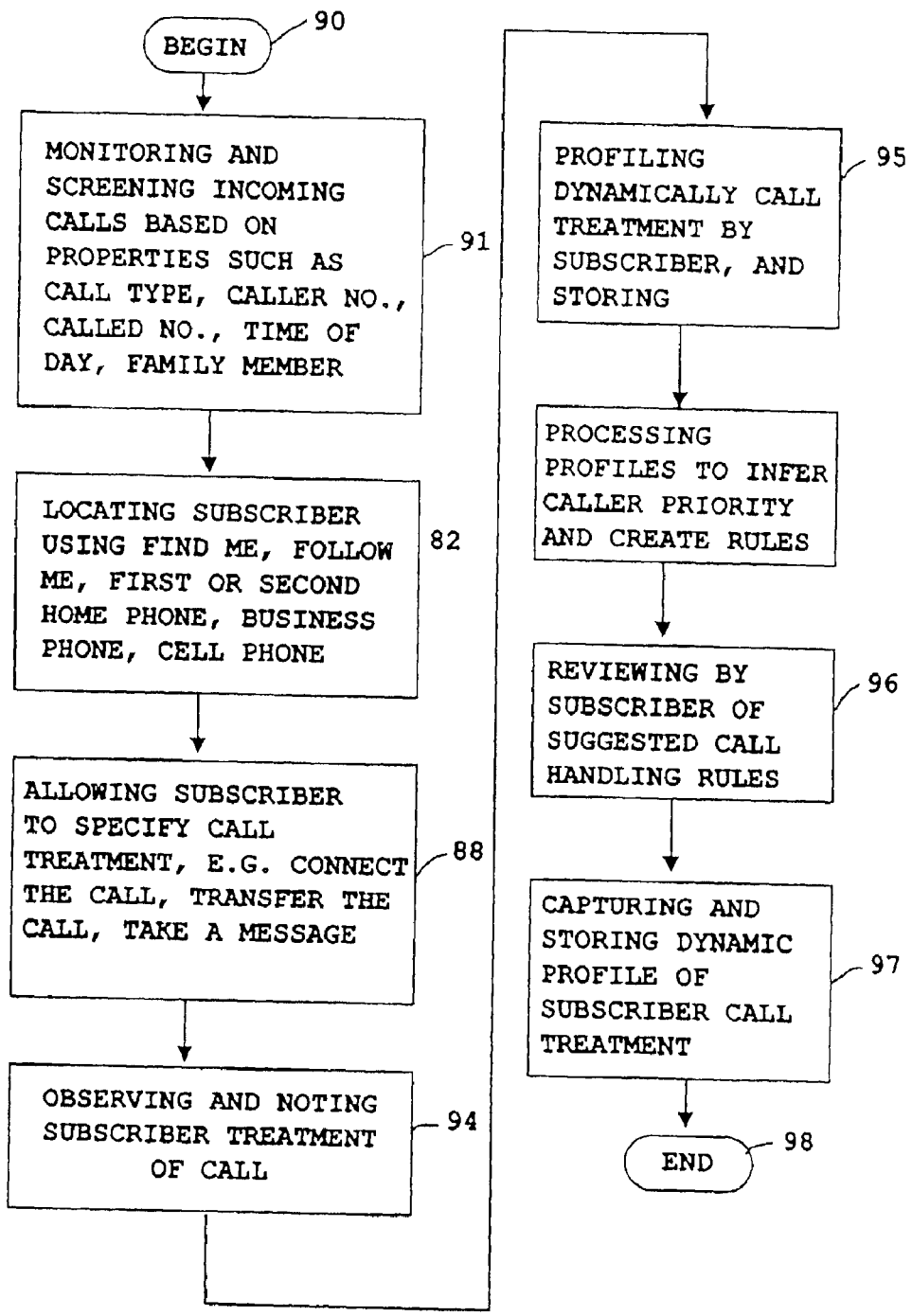
FIG. 13 is a sequence of steps in a method flow chart illustrating capturing the dynamic profile of a subscriber.

The central server 29 is able to capture and store the dynamic profile of the subscriber's rules for treatment of incoming calls. This is illustrated in FIG. 13. FIG. 13 is a sequence of steps in a method flow chart. Block 90 is "begin". Block 91 is "monitoring and screening incoming calls based on properties such as call type, caller number, called number, time of day, family member called". Block 92 is "locating subscriber using find me, follow me, first or second home phone, business phone, cell phone and various Internet devices". Block 93 is "allowing subscriber to specify call treatment, e.g., connect the call, transfer the call, take a message". Block 94 is "observing and noting subscriber treatment of call". Block 95 is "profiling dynamically call treatment by subscriber". Block 96 is "reviewing by subscriber of suggested call handling rules". The subscriber is not asked to enter his rules for handling calls but rather the subscriber is presented with rules determined implicitly by the central server 28. The subscriber than has an opportunity to approve or to reject the proposed rules. Block 97 is "capturing and storing dynamic profile of subscriber call treatment". This dynamic profile may be stored in the message store memory 33 of the central server 28. In addition an address book may be compiled at that same location so that if the subscriber wishes to place a call, or to return a call following a telephone message, it is easy to initiate using the numbers logged in the address book in the message store memory 33 of the central server 28. In FIG. 13, the last block 98 is "end".

The central server 28 of the system of the present invention gradually becomes more useful to the subscriber as it learns the subscriber's profile. This profiling also adds another dimension to the system of the present invention. This is an advertising or media dimension. The profiling creates a community of users. People that call each other on the telephone have a community of interests. Thus the profiling information that is stored becomes, in effect, a collaborative filter based on telephone numbers. Recording of calls made to other numbers indicates similar patterns of behavior. This is based on shared interests. Thus, this gradual interactive development of a profile based on decisions made by the client may be used for advertising purposes, if desired.

Figure 14:
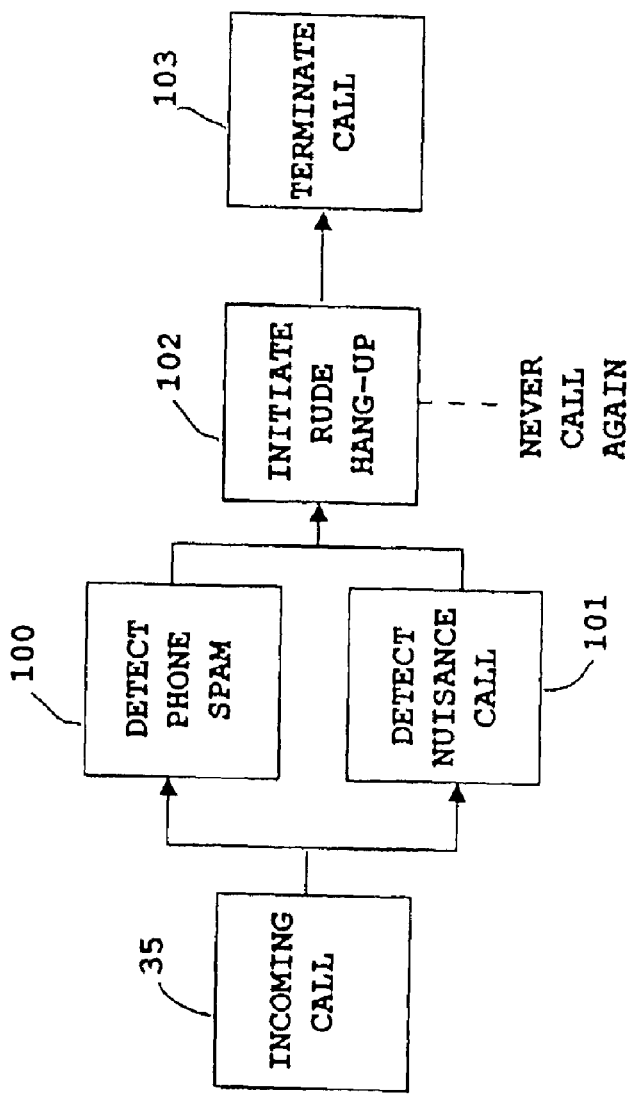
FIG. 14 is a schematic diagram indicating how the system can handle undesired incoming calls.

FIG. 14 is a schematic diagram indicating how the system can handle undesired incoming calls. At the left of FIG. 14 there is illustrated an incoming call 35. The call is coupled to a detector for detecting phone "spam" 100. The incoming call 35 is also connected to a detector for detecting nuisance calls 101. Both of these types of telephone calls are unsolicited, unwanted, and undesirable types of calls. When these types of calls are detected, they are forwarded to block 102 which initiates a "rude" hang-up. This type of hang-up would have an audible message to the caller saying something such as "never call again". Then, the signal is passed on to block 103 which terminates the call.

Figure 15:
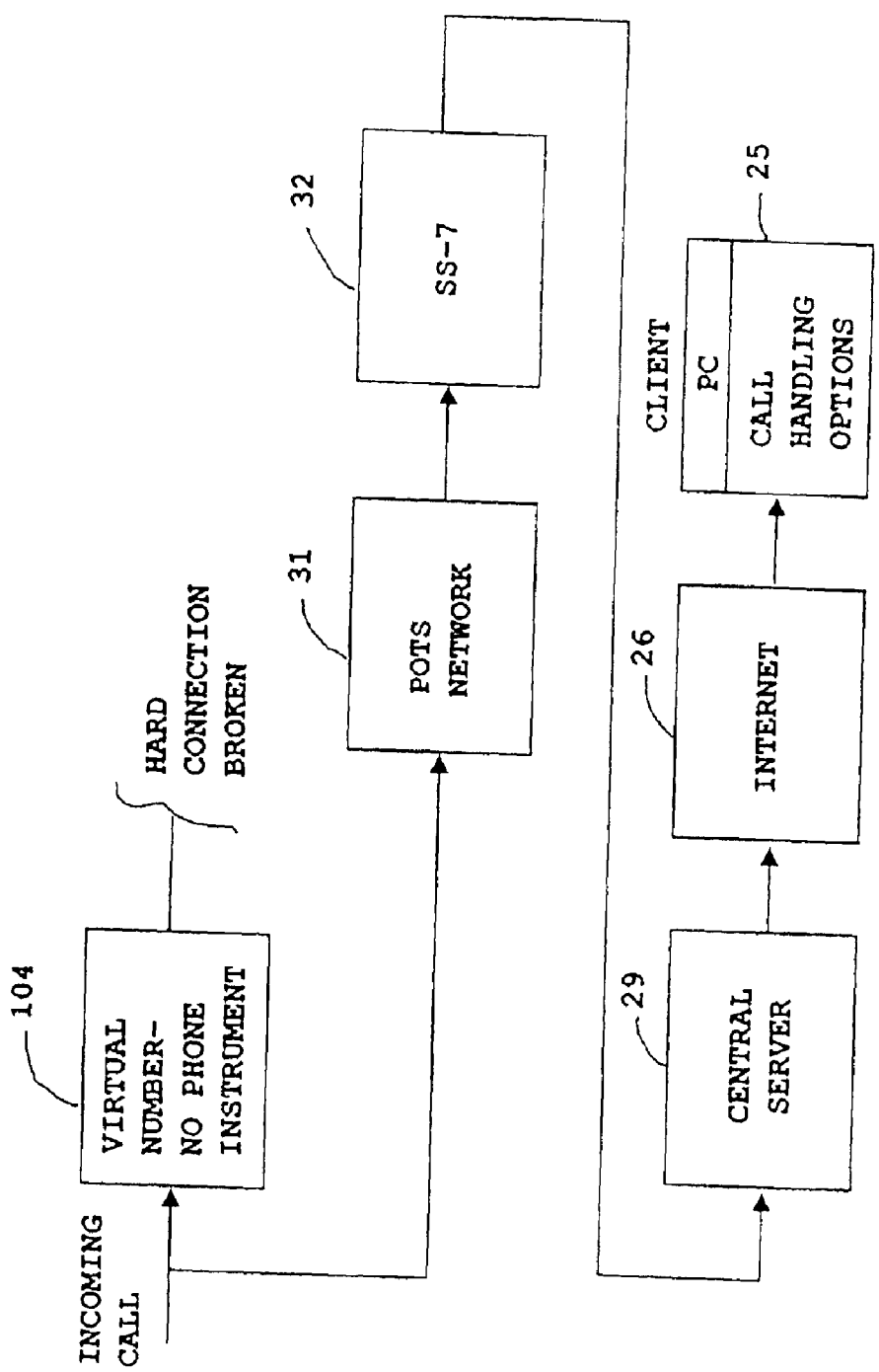
FIG. 15 is a schematic diagram illustrating a second embodiment of the call control system of the present invention.

Typically, the system only answers calls for the client when the client's telephone line is busy and he is logged on the Internet. However it can be arranged for the system to answer all of the client's incoming calls. This is illustrated in FIG. 15. FIG. 15 is a schematic diagram illustrating a second embodiment of the call control system of the present invention. In this embodiment of the invention, the hard connection from the POTS to the subscriber is broken. This is done by the central server system providing a virtual phone number to the client without providing a telephone instrument. This is illustrated in block 104. The virtual telephone number is given to the client who uses it in his advertising so that all calls will be made to that number but in fact those calls will be intercepted by the system of the present invention.

The present invention has been particularly shown and described with respect to certain preferred embodiments and features thereof. However, it should be readily apparent to those of ordinary skill in the art that various changes and modifications in form and detail may be made without departing from the spirit and scope of the inventions as set forth in the appended claims. The inventions illustratively disclosed herein may be practiced without any element which is not specifically disclosed herein.

What is claimed:

1. A method of providing telecommunication services, comprising:

receiving at a server a call from a first entity intended for a second entity that was forwarded via a PSTN, wherein the call was forwarded by a call directing method selected from the group including busy call forward, no answer call forward, call forward all, and telephone number portability;

determining whether a first computer device of the second entity is online;

sending a message to the first computer device via an Internet Protocol connection indicating the call has been received and providing identification information related to the call originator and the number of the second entity that was entered; and directing the call to one of a plurality of telephonic devices according to a phone number of the second entity that was entered by the first entity.

2. The method, as recited in claim 1, further comprising:

receiving an instruction from the second entity for the server to answer the call;

answering the call via the server;

playing a message to the first entity;

recording a message from the first entity; and storing the first entity message on the server.

3. The method, as recited in claim 1, further comprising:

determining whether the second entity has defined at least a first rule regarding processing calls; and processing a call from a third entity at least partly in response to the first rule.

4. The method as recited in claim 1, further comprising:

storing a plurality of different audio greetings from the second entity in a memory storage device; and playing a selected one of the plurality of different audio greetings to the first entity in response to an instruction received from the second entity after receiving the first entity's call.

5. The method as recited in claim 1, wherein the call was forwarded at least partly as a result of the second entity accessing the Internet using a telephone line to which the call was placed so that the telephone line was busy.

6. A method for providing expanded telecommunication services on a telecommunication system where a call from a first entity to a second entity is placed after the first entity enters a number for the second entity, comprising:

receiving the call from the first entity as a result of a call directing method selected from the group including one or more of busy call forward, no answer call forward, call forward all, and telephone number portability;

determining whether the computer device of the second entity is communicating with the server;

sending a message to the computer device over a data network indicating the presence of the call and identifying the number of the first entity;

holding the call at the server; and cross-connecting the first entity and the second entity.

7. A method for providing expanded telecommunication services on a telecommunication system where a call from a first entity to a second entity is placed when the first entity enters a number for the second entity, comprising:

receiving the call from the first entity at a server via a switched telephone network as a result of a call directing method selected from the group including at least one of busy call forward, no answer call forward, call forward all, and telephone number portability;

determining whether the computer device of the second entity is communicating with the server over a network;

sending a message to the computer device over the network indicating the presence of the call and delivering identifying information of the first entity and a verbal communication from the first entity;

receiving input from the second entity via the computer device; and directing the call in response to the input.

8. The method as defined in claim 7, further comprising:

receiving a second call at the server; and directing the second call in response to a rule predefined by the second entity.

9. The method as defined in claim 7, further automatically creating a set of call handling rules based on how the user handles calls.

10. The method as defined in claim 7, further comprising automatically creating a set of call handling rules based on how the user handles calls for at least one of different caller numbers, different called numbers, different times of day, and different calendar days.

11. The method as defined in claim 7, further comprising:

recording a plurality of different audio greetings provided by the second entity;

storing the audio greetings in a memory storage device; and playing a pre-selected one of the audio greetings to a caller.

12. The method as defined in claim 7, further comprising:

determining whether first entity instructions are stored regarding automatic handling of incoming calls; and directing at least one incoming call based on the special instructions.

13. A system providing telephone services connectable to a telecommunications network, the system comprising:

a call processing system connectable to a switched telephone network to receive calls directed to the call processing system by a call directing method selected from the group including at least one of busy call forward, no answer call forward, call forward all, and telephone number portability, the call processing system including:

a data storage device that stores software configured to:

determine if at least a first subscriber's computing device is communicating with the server over a data network;

transmit caller communications for incoming calls to the first subscriber's computing device over the data network so that the subscriber can screen the calls;

receive first subscriber call processing instructions over the data network;

process incoming calls in accordance with the first subscriber call instructions.

14. The system as defined in claim 13, further comprising a plurality of stored greeting messages recorded by the first subscriber, wherein the software is further configured to selectively play one of the plurality of stored greeting messages to a caller in response to a first subscriber instruction.

15. A method of providing a called party the ability to screen calls, the method comprising:

receiving, at a call processing apparatus, a forwarded call from a calling party intended for the called party, wherein signaling information associated with the forwarded call includes the calling party's phone number, and wherein the call was forwarded to the call processing apparatus as a result of a call directing method selected from the group including at least one of busy call forward, no answer call forward, and call forward all;

playing a greeting to the calling party;

opening a communication channel over the Internet with a networked computer associated with the called party; and transmitting in substantially real time at least a portion of the signaling information and a voice communication from the calling party over the communication channel to the networked computer so that the called party can screen the calling party's call.

16. The method as defined in claim 15, further comprising:

receiving an instruction over the communication channel from the called party to connect the calling party to the called party; and connecting the calling party and the called party.

17. The method as defined in claim 15, further comprising receiving an indication that the networked computer is communicating with the call processing apparatus before performing the act of transmitting speech from the calling party over the Internet communication channel to the networked computer for reproduction.

18. The method as defined in claim 15, further comprising:

receiving, at the call processing apparatus, a second forwarded call from a second calling party intended for the called party, wherein signaling information associated with the second forwarded call includes the second calling party's phone number;

receiving a voice communication from the second caller;

causing the second party's phone number to be transmitted to a cell phone associated with the called party so that the called party can determine the second caller's identity;

transmitting the voice communication from the second caller to the cell phone so that the called party can screen the second caller; and receiving a call processing instruction via the cell phone.

19. The method as defined in claim 15, wherein the calling party is separated from the call processing apparatus by at least a first local carrier switch.

20. The method as defined in claim 15, wherein the networked computer is at least one of a personal computer, a handheld computing device, a wireless telephone, a television, and a web interface appliance.

21. The method as defined in claim 15, further comprising:

receiving a third call from a second calling party;

transmitting a voice communication from the second calling party to the networked computer;

receiving a second instruction from the called party; and playing a predetermined message indicating that the third call is not being accepted to the third calling party at least partly in response to the second instruction.

* * * * *